C. F. KOCHER.
HARVESTER REEL.
APPLICATION FILED MAR. 18, 1920.
1,365,503.  Patented Jan. 11, 1921.
2 SHEETS—SHEET 2.
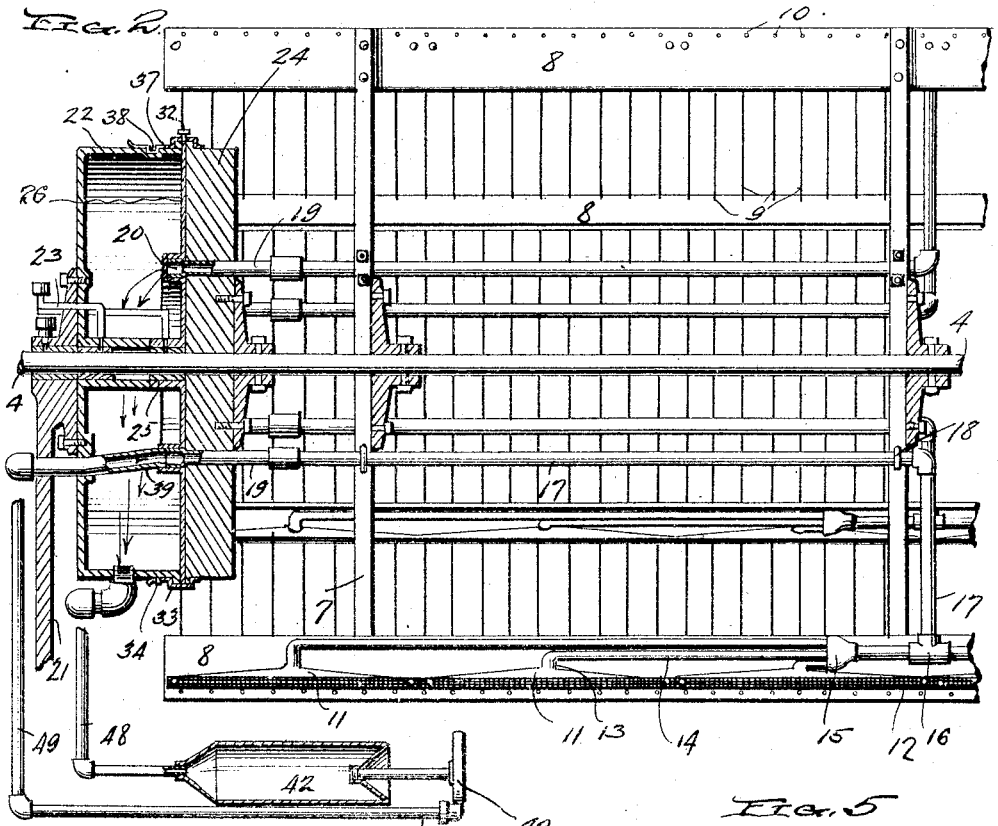
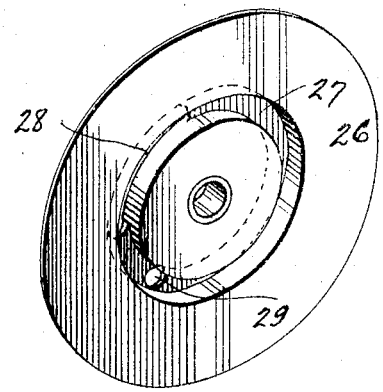
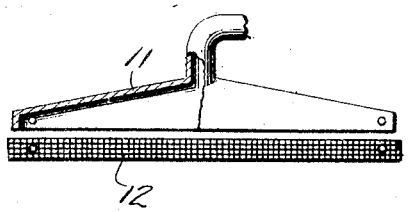
Inventor
Clinton F. Kocher

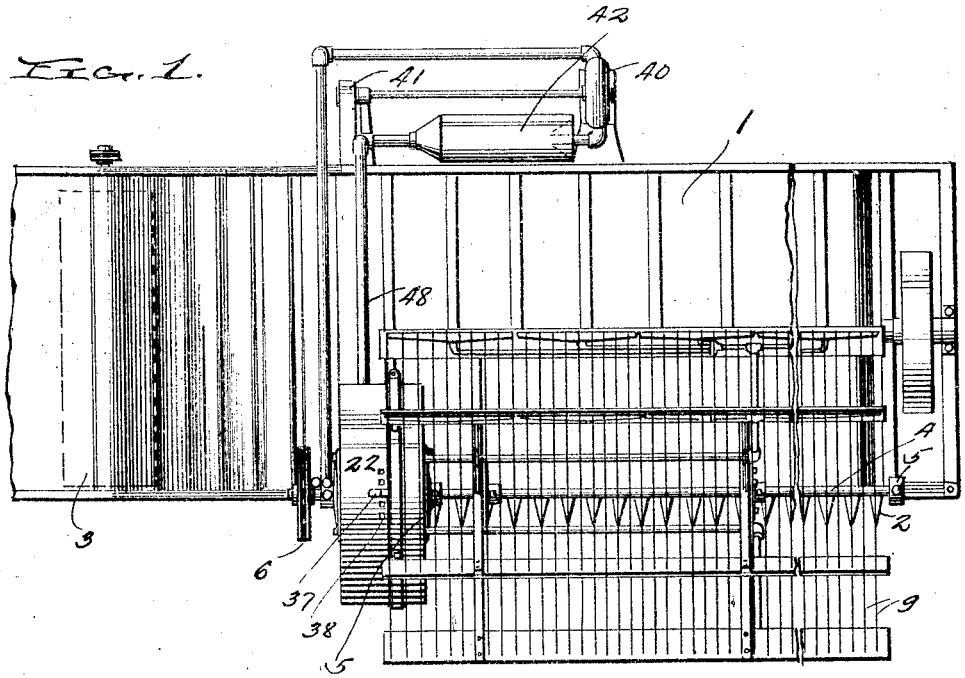
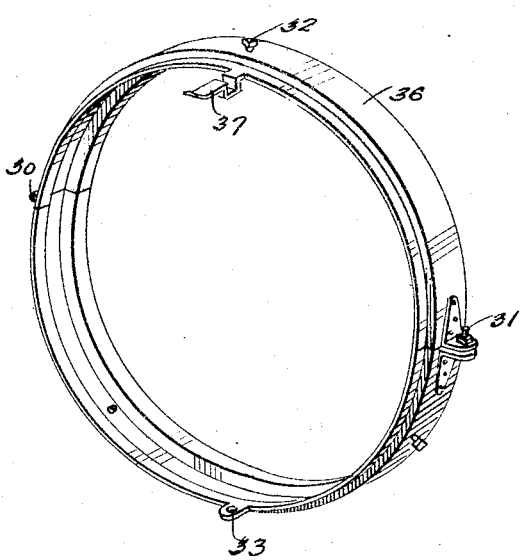
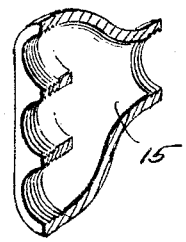

UNITED STATES PATENT OFFICE.

CLINTON F. KOCHER, OF COATS, KANSAS.

HARVESTER-REEL.

1,365,503.  Specification of Letters Patent.  Patented Jan. 11, 1921.

Application filed March 18, 1920. Serial No. 366,736.

*To all whom it may concern:*

Be it known that I, CLINTON F. KOCHER, a citizen of the United States, residing at Coats, in the county of Pratt, State of Kansas, have invented certain new and useful Improvements in Harvester-Reels; and I do hereby declare the following to be a full, clear, and exact description of the invention, such as will enable others skilled in the art to which it appertains to make and use the same.

This invention relates to harvesters, and more especially to the reels; and the primary object thereof is to produce a reel having means for drawing material to its blades just forward of the cutting mechanism whereby fallen grain is saved.

One feature consists in providing the reel with an encircling openwork rim made preferably of spaced wires and whose purpose is to feed certain of the material more evenly onto the platform and to keep some of the material from too close contact with the suction manifolds.

Another feature is the provision of means for throwing the material off the reel blades at the moment they pass across the cutting mechanism.

Specifically, the last-named feature is carried out pneumatically, by using an air blast from the same mechanism which generates the vacuum for attracting the material to the blades.

Another feature is the provision of means whereby adjustment is permitted of the points at which the suction and blast are connected with each moving blade.

Another feature of the invention is the introduction of a vacuum chamber in the suction pipe for trapping pebbles, sand, and other foreign matter that may be drawn into the pneumatic system.

In addition to these general features, the invention includes several details of advantage, all as hereinafter more fully described and claimed, and as shown in the drawings wherein:

Figure 1 is a plan view of a portion of a harvesting machine, showing its platform equipped with this improved reel.

Fig. 2 is a vertical section through the inner end of the reel and one of the blades, and a diagram of the fan and the vacuum chamber or air cleanser.

Fig. 3 is an enlarged perspective detail of the clamping band.

Fig. 4 is a perspective detail of the end plate for the drum.

Fig. 5 is a detail of one of the manifolds.

Fig. 6 is a sectional detail of one of the distributer couplings.

In Fig. 1 is shown the platform 1 and across its front edge the cutting mechanism 2 of a harvester, and 3 indicates its main wheel. The reel shaft 4 is mounted in suitable bearings 5 supported by standards above the cutting mechanism and rotated by appropriate means, as by a chain belt led from its sprocket wheel 6 to some moving part of the harvester mechanism. Spokes 7 radiate from said shaft as usual and carry at their outer ends blades 8—preferably about six in number—which are herein shown as long narrow boards, and which, in the rotation of the shaft in the proper direction, successively pass to the rear over the cutting mechanism to feed the material thereto and, after it has been cut, to throw it back onto the platform, whence it is carried inward to the binding mechanism or handled in some other way not important in the present case. But when the wheat or other material has been broken down, it is desirable to raise it just in advance of the cutting mechanism and hold it while the stalks are being cut. It is the broad purpose of my prior application above mentioned to accomplish this lifting of the stalks pneumatically, by vacuum suction exerted along the blades. One feature of the present invention lies in surrounding the entire reel with an openwork rim, preferably made up of wires 9 passing through notches or holes 10 in the blades near their outer edges and wound spirally or in strictly circumferential convolutions. Stalks of grain which have fallen forward or rearward with respect to the line of progress of the harvester are picked up by the suction described below and held against these spaced wires while the stalks are being cut off, and the grain kernels are not dropped on the ground. Stalks of grain which have fallen transversely of the line of progress will be also lifted by the suction and drawn against these wires, and if they are not straightened out they will be at least carried around to a point where, when they have been cut off, they will fall onto the platform together with their kernels. On the whole, the encircling wires will conserve a large percentage of the kernels which would be otherwise lost, and will produce a more even spreading of the tops on the platform or on the carrier moving over the same. A further function for these wires will be set forth below.

Connected with each blade are a number of suction heads 11, each preferably having a strainer 12 over its open mouth to prevent the entrance of particles of stalks etc., and from the stem 13 of each head leads a small pipe 14. Fig. 2 shows three of these suction heads and pipes along the inner half of one blade, the pipes connected with a distributer coupling 15 whose stem in turn is connected with a T-coupling 16. From the stem of the latter leads an air pipe 17 which passes first diametrically inward like a hollow spoke of the reel and thence along its shaft and is clipped at 18 to the solid spokes. At the inner end of this air pipe is a head consisting of a stem 19 and an enlarged mouth 20. The outer end of the blade will carry the remainder of the suction heads, and the latter will be sufficient in size and number to extend the full length of the longest blade. It will be seen that by this detail air is equally distributed throughout the length of the blade. Also it should be noticed that the mouths of the several suction heads stand a little distance inward from the wires 9 so that suction at the mouths will draw the stalks against the wires but not ordinarily against the strainers 12 which might choke the mouths.

Fast on the shaft 4 is a disk 24 having holes through which pass the stems 19. Carried by a standard 21 is a drum 22 having internal bearings 25 for the shaft, and these bearings may be lubricated through cups and ducts as shown at 23. That side of the drum next the disk is open, and over it lies a face plate 26 having a central opening for the passage of the shaft and a channel 27 around said opening, this channel provided at one point with an elongated suction port 28 and at another point with a blast port 29; and the enlarged ends or mouths 20 of the stems 19 travel around within said channel and move first across the suction port and then across the blast port. By preference the face plate is mounted within a clamping band 36 which, as seen in Fig. 3, is made in two halves connected at one side by a hinge 30 and at the other side by outstanding ears and a tightening bolt 31, and set screws 32 are passed through this band and engaged with the edge of the plate 26 for permitting the latter to be adjusted and for holding it after it is adjusted. In other words, the band is a frame for the plate, the plate is adjustable in its frame, and the frame may be wholly removed when desired. This frame or band has a lip 33 at one point adapted to be engaged with a lug 34 on the drum 22, and opposite these elements the band has a latch 37 adapted to be sprung into a notch or depression 38 in the drum. By these or equivalent means the frame is detachably mounted on the drum, and its plate closes the open side thereof excepting for a hole in the plate through which the shaft passes.

The numeral 40 is herein used to designate an air pump or fan or equivalent instrumentality, but a fan is diagrammatically shown because I make use of both its intake and its exhaust. Communicating with the interior of the drum is a suction pipe 48 connected to the intake of the fan. Connected with the exhaust of the fan is a blast pipe 49 which leads to a pipe 39 extending across within the drum and communicating only with the blast port 29. Therefore the action of the fan is to set up suction in all the suction heads, through the air pipes 17 and the heads when the mouths 20 register with the suction port 28, whence the air is exhausted through the drum and the pipe 48; and at the same time the action of the fan is to produce a blast of air through the pipes 49 and 39, the same entering each mouth 20 as it passes the blast port 29, so as to produce a puff of air along all the suction heads of a blade instead of a suction.

The parts are so set that each blade as it descends at the front of the reel has its air pipe first connected with the suction pipe so that its suction heads raise the fallen stalks of grain and permit the cutting mechanism to sever them near the ground, and then as the blade moves onward, the suction is cut off when the mouth passes the lower end of the port 28, and just after the blade passes to the rear over the cutting apparatus, said mouth registers with the port 29 and there is a blast of air out of all the suction heads so that the stalks are thrown off the wires of the reel onto the platform. The fan is rotated by suitable connections 41 with the harvester mechanism through means not necessary to elaborate, and it runs constantly. Interposed within the suction pipe is a vacuum chamber or cleanser 42 whose details of construction need not be elaborated. When the drum 22 is of ample size it may serve as a vacuum chamber, but if it is rather small there will be need of a vacuum chamber within the suction pipe so that the vacuum will not build up too rapidly between the times when the heads of the air pipes pass the suction port 28. However, the principal function of this element 42 is that of an air cleanser, because it may be constructed to trap and retain such particles as enter the air system through the strainers 12 over the mouths of the suction heads. These particles may include pieces of stalks, dirt, kernels, sand, and pebbles, all of which should be kept out of the fan for obvious reasons. When the face plate 26 is properly adjusted, suction will be applied to the suction heads in each reel blade, followed by a puff of air therethrough, at exactly the proper time to perform the service desired, and the addition of the wires around the reel will cause the kernels which are jarred from the stalks to fall onto the platform or its apron.

What is claimed as new is:

1. In a harvesting machine, the combination with the cutting mechanism; of a reel, and means for sucking into contact with the reel the grain to be cut.

2. In a harvesting machine, the combination with the cutting mechanism; of a reel including blades provided with suction heads having orifices, and means for effecting suction through the orifices into the heads.

3. In a harvesting machine, the combination with a cutting mechanism; of a rotary reel including hollow heads provided with suction orifices, and means for effecting suction through the orifices into the heads at a certain point in the rotation of the reel.

4. In a harvesting machine, the combination with the cutting mechanism; of a reel including hollow suction heads having suction orifices and hollow spokes communicating therewith, means for sucking, and means for intermittently establishing sucking relation between the sucking means and the hollow spokes.

5. In a harvesting machine, the combination with the cutting mechanism and standards, one of which latter has a port; of a reel rotatably mounted with respect to the standards and including hollow perforated heads on its blades and pipes communicating with the heads and disposed for successive registration with the port when the reel is rotated, and means for establishing suction from the port and through each head when its pipe is in communication with the port.

6. In a harvester reel, the combination with a series of blades rigidly mounted around and along an axial shaft, and a series of substantially circumferential wires at the outer edges of the blades; of suction heads carried by the blades having mouths spaced inward from said wires, and means for creating suction through the heads at intervals.

7. In a harvester, the combination with the cutting mechanism; of a reel, means for attracting material to the reel just prior to the cutting, and means for repelling the material later.

8. In a harvester, the combination with the cutting mechanism; of a reel, means for attracting material toward the reel just forward of an upright plane through said cutting mechanism, and means for repelling said material just in rear of said line.

9. In a harvester, the combination with the cutting mechanism; of a rotary reel including a plurality of blades, a series of suction heads along each blade, and mechanism for producing suction through said heads forward of the line of cut and a blast through said series in rear of said line.

10. A harvester reel rotatably mounted above a cutting apparatus and including a number of blades, a series of suction heads mounted along each blade, a single air pipe and couplings and plural suction pipes connecting them with the respective heads, means for producing suction through said pipe when the blade is just in advance of the cutting mechanism, and means for producing an air blast through such pipe when the blade is just in rear of said mechanism.

11. In a harvester, the combination with a platform having a cutting apparatus along its front edge, a rotary reel including a number of blades moving to the rear above said apparatus, and spaced wires passing circumferentially around the reel; of suction heads on the blade spaced inward from the wires and having mouths opening toward them, air pipes connected severally with the suction heads on the blades, a fan mechanism and its blast and suction pipes, and means whereby the air pipe of each blade is connected with the suction pipe as said blade approaches a point over the cutting mechanism and is connected with the blast pipe as it passes said point.

12. In a harvester, the combination with a platform having a cutting apparatus along its front edge, a rotary reel including a number of blades moving to the rear above said apparatus, and spaced wires passing circumferentially around the reel; of suction heads on the blades spaced inward from the wires and having their mouths opening toward them, air pipes connected severally with the suction heads on the blades, a fan mechanism and its blast and suction pipes, a cleaning chamber within said suction pipe, mouths on the several air pipes, and a plate having an elongated port connected with the suction pipe and a blast port connected with the blast pipe, the ports disposed in the path of movement of the mouths on said air pipes, for the purpose described.

13. In a harvester reel, the combination with a shaft, spokes, blades carried thereby, suction heads mounted on the blades, air pipes connected with the heads and leading along the spokes, a disk fast on the shaft, and heads including stems through said disk connected with the respective air pipes and mouths at the inner side of the disk; of a plate having an annular channel in which said mouths move, the channel pierced with two ports, and means for setting up air suction through one port and a blast of air through the other.

14. In a harvester reel, the combination with a shaft, spokes, blades carried thereby, suction heads mounted on the blades, air pipes connected with the suction heads and leading along the spokes, a disk fast on the shaft, and heads including stems through said disk connected with the respective air pipes and mouths at the inner side of the disk; of a fixed drum through which the shaft is rotatably mounted, a face plate on the drum next said disk and having a channel within which said mouths move, the channel provided with a suction port opening into the drum and with a blast port, a pipe from the latter through the drum, means for supplying a blast of air to this pipe, and means for setting up suction within the drum.

15. In a harvester reel, the combination with a shaft, spokes, blades carried thereby, suction heads mounted on the blades, air pipes connected with the manifolds and leading along the spokes, a disk fast on the shaft, and heads carried by said disk and connected with the respective air pipes; of a drum through which said shaft passes, its outer end being closed and fixedly supported and its inner end open, a face plate for said inner end having a channel in which said heads move, the channel provided with two ports, a frame around said plate, means for fastening the frame to the drum, means for setting up suction within the drum and through one port, and independent means for creating a blast through the other port.

16. In a harvester reel, the combination with a shaft, spokes, blades carried thereby, suction heads mounted on the blades, air pipes connected with the suction heads and leading along the spokes and having heads; of a drum through which said shaft passes, its outer end being closed and fixedly supported and its inner end open, a face plate for said inner end having a channel in which said last named heads move, the channel provided with two ports, a clamping band around said face plate, means for holding the latter adjustable within the band, means for latching the band on the drum, means for setting up suction within the drum, and independent means for creating a blast through the other port.

In testimony whereof, I affix my signature, in the presence of two witnesses.

CLINTON F. KOCHER.

Witnesses:
W. B. HESS,
D. R. SCOTT.